United States Patent
Brimmer et al.

[15] 3,674,686
[45] July 4, 1972

[54] FILTER PRECOATING METHOD

[72] Inventors: Donald B. Brimmer; James Stuart Brown, both of Willingboro, N.J.; Charles H. Becker, Yardley, all of Pa.

[73] Assignee: De Laval Turbine, Inc., Trenton, N.J.

[22] Filed: Feb. 24, 1970

[21] Appl. No.: 13,268

[52] U.S. Cl. .................................210/37, 210/38, 210/75
[51] Int. Cl. .....................................B01d 15/04, B01d 37/02
[58] Field of Search ............137/268; 210/24, 75, 130, 137, 210/167, 193, 194, 37, 38; 417/79, 191

[56] References Cited

UNITED STATES PATENTS

| | | | |
|---|---|---|---|
| 3,214,369 | 10/1965 | Felix | 210/75 X |
| 3,250,703 | 5/1966 | Levendusky | 210/75 X |
| 3,199,677 | 8/1965 | Schneider | 210/193 X |
| 2,162,074 | 6/1939 | Everson | 210/194 X |
| 2,367,557 | 1/1945 | Atwood | 210/75 X |
| R21,893 | 9/1941 | Horvath | 417/79 |
| 3,501,060 | 3/1970 | Pfeuffer | 210/193 X |
| 3,250,704 | 5/1966 | Levendusky | 210/37 X |

Primary Examiner—Reuben Friedman
Assistant Examiner—Thomas G. Wyse
Attorney—Smith, Harding, Earley & Follmer

[57] ABSTRACT

To control the flocculation of a mixture of fine anion and cation ion exchange resins in order to form an even coating on a filter septum, the resins are first mixed in a heavy slurry, and are then added at a controlled rate to the recirculation liquid entering the filter vessel.

6 Claims, 4 Drawing Figures

INVENTORS
DONALD B. BRIMMER
JAMES STUART BROWN &
CHARLES H. BECKER
BY
Smith, Harding, Earley & Follmer
ATTORNEYS INVENTORS
DONALD B. BRIMMER
JAMES STUART BROWN &
CHARLES H. BECKER
BY
Smith, Harding, Early & Follmer
ATTORNEYS

FILTER PRECOATING METHOD

BACKGROUND OF THE INVENTION

This invention relates to an apparatus and method for applying a coating of finely divided anion and cation exchange resin particles as a precoat to a filter septum which will then effect not only filtration, but demineralization of the liquid passing through the cake which is formed. Combined filtration and demineralization of water is desirable in boiler feed systems and in various manufacturing operations. The matter of precoating a filter septum by depositing on it a layer of ion exchange resin particles is disclosed in U.S. Pat. No. 3,250,703, issued May 10, 1966 to Joseph A. Levendusky.

In precoating filters with ion exchange particles, the production of a uniform coating on the filter septum has been difficult to accomplish heretofore. The uneven distribution of ion exchange particles is due primarily to flocculation, which results from the interaction of the ion exchange particles in the liquid which carries them into the filter vessel.

The ion exchange resin particles are ordinarily carried by a recirculating stream which passes through the filter septa. A decrease in the velocity of the carrying liquid occurs as it passes into the filter vessel from a narrow conduit leading to the filter vessel. Increased flocculation occurs as velocity decreases, and flocs of large size may form and may become deposited on the vertical surface of the filter septa in a manner such that the cake which is formed is of uneven thickness.

Heretofore, polyelectrolytes or other wetting agents or agents for controlling coagulation have been used to prevent the formation of floc. These chemical agents are added to the slurry which is held in a precoat tank from which the slurry is introduced to the filter through the inlet of the filter vessel, and to which the filter discharge is returned. Flocculation is affected by the amount and nature of the chemical agents which are used. When chemical agents are used, flow of liquid from the precoat tank to the filter is stopped while the slurry in the precoat tank is formed and conditioned by the addition of chemical agents. The addition of these chemical agents must be carried out accurately, and the performance of tests is required in order to determine that the appropriate amounts of the various chemical agents have been added.

In ion exchange resin mixtures, the size of the floc which is formed is dependent not only on velocity, but also on such factors as concentration, temperature, resin composition, resin mixture and streaming potential.

SUMMARY OF THE INVENTION

In accordance with this invention, an unconditioned slurry, comprising a mixture of cation exchange resins and anion exchange resins is added to the carrying liquid in a recirculating system while the liquid is in motion toward the filter vessel. The resin slurry is stored temporarily in a separate tank which does not have the recirculating liquid flowing through it. The resin slurry is not stored in the precoat tank.

The rate of introduction of the slurry into the recirculating stream of carrying liquid is so regulated that the material is deposited on the filter septum at the same rate at which it is introduced into the recirculating stream, thus preventing an increase in concentration within the filter vessel, resulting in the formation of large flocs which produce uneven coating of the filter septum. No addition of chemical agents to the ion exchange resin slurry is necessary.

DESCRIPTION OF THE PREFERRED EMBODIMENTS

Figure 1:
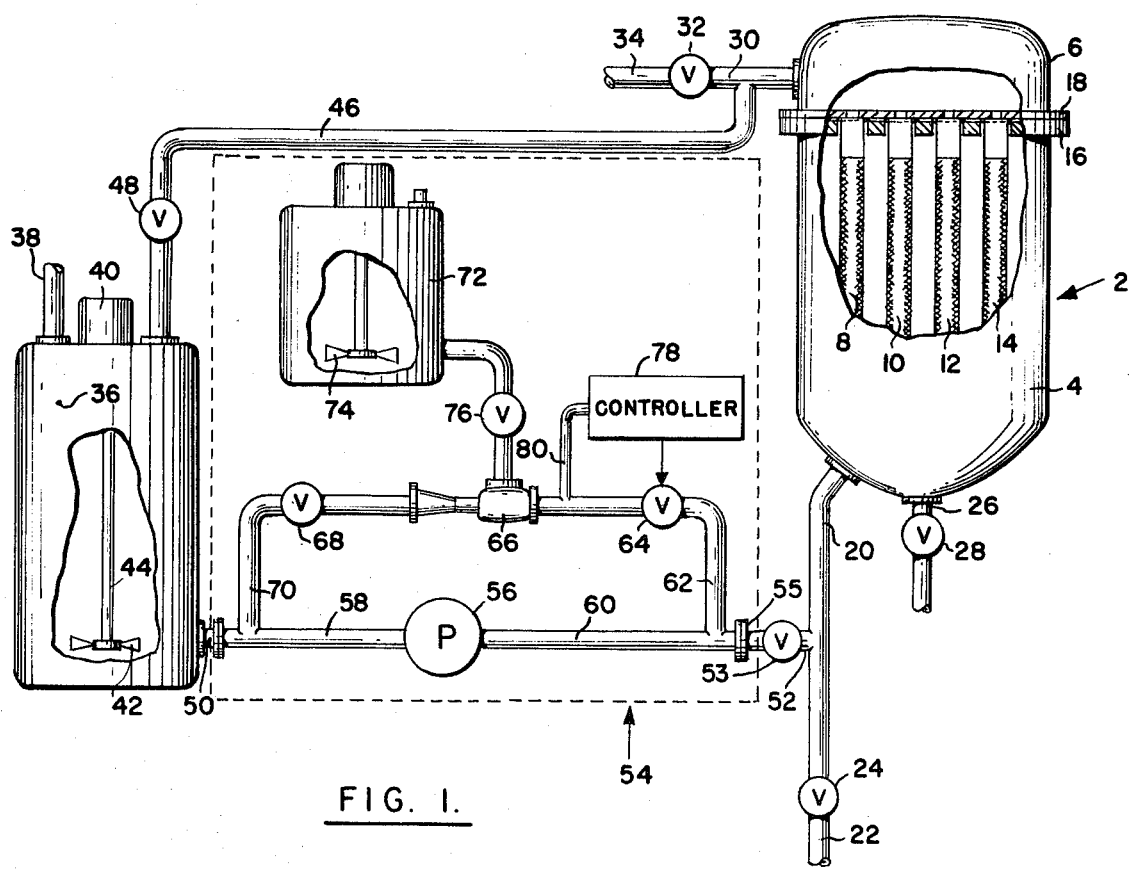
FIG. 1 is a schematic diagram of a preferred embodiment of the precoating system in accordance with the invention, showing, in a rectangle consisting of broken lines, the apparatus for introducing a resin slurry into a carrying liquid stream approaching a filter vessel.

FIG. 1 shows an embodiment of the invention in which the resin slurry is introduced into the recirculating liquid through an eductor arranged in a flow path leading from the outlet of a recirculation pump to its inlet.

Filter vessel 2 is a vessel of the type described in detail in U.S. Pat. No. 3,312,352, issued Apr. 4, 1967 to Daniel A. Shiells. The vessel comprises a lower chamber 4, and an upper chamber 6, the chambers being separated from each other so that liquid in the lower chamber is required to pass through a perforate surface consisting of tubular filter screens of wire mesh, including screens 8, 10, 12 and 14 in order to pass into upper chamber 6. These tubular screens constitute the filter septum for supporting the filter cake. The tubular screens are supported by a tube support consisting of member 16, which has openings through which the tubular screens extend, and member 18 which clamps the lips at the upper ends of the tubular screens against the upper surface of member 16. Member 18 is provided with perforations which are arranged above the upper ends of the tubular screens to allow flow from the interior of the screens into upper chamber 6.

An inlet pipe, leading to the interior of the lower chamber 4 is provided at 20. Pipe 22, which leads from the source of liquid to be filtered, is connected to pipe 20 through valve 24. A backwash outlet 26 is provided with a valve 28.

The upper chamber 6 has an outlet 30, which is connected through valve 32 to a pipe 34, which may lead to a storage tank or to apparatus utilizing liquid which is purified and demineralized by the filter.

In the ordinary operation of a filter of this type, the filter screens are precoated with a "filter aid", for example diatomaceous earth, which forms a porous cake on the screens of the filter septum. Following precoating, liquid to be filtered is introduced into the lower filter chamber, and filtered liquid is removed from the upper chamber through its outlet. Additional filter aid may be introduced along with the liquid which is to be filtered. The introduction of additional filter aid is known as "body feed", and its purpose is to prevent clogging of the filter.

Eventually, the filter must be cleaned, and this is accomplished by backwashing, i.e., introducing water into the upper chamber and forcing it downwardly through the filter screens in the reverse direction to remove the filter cake and filtered matter which has built up on the filter septum.

Various other types of filter vessels can be used in place of the filter shown in FIG. 1. For example, the filter septum does not necessarily consist of tubular screens; it may consist of flat screens.

A precoat tank 36, for temporarily storing filter aid, is provided with an opening 38 for the introduction of diatomaceous earth or other filter aid and for the introduction of a liquid to form a precoat slurry. An electric motor 40, mounted on the top of tank 36, drives an agitator 42, in the interior of the tank, through shaft 44.

Pipe 46 connects outlet 30 of the upper filter vessel 6, through valve 48 to the interior of precoat tank 36. Pipe 46 provides a path for recirculation of liquid from the filter vessel to the precoat tank during precoating of the filter screens.

Near the bottom of precoat tank 36, there is provided a flanged outlet 50.

A "T" connection is provided in inlet pipe 20, and the leg 52 of the T connection is connected through a valve 53 to a flange 55. Valve 53 is ordinarily closed during filtration, but is opened during precoating and whenever body feed is to be introduced.

It will be apparent that a pump alone could be connected between flanged outlet 50 and flange 55 to effect recirculation of liquid through the filter vessel and the precoat tank. In effect, this is what was done in the past. A resin slurry was introduced into the precoat tank, and delivered by the pump to the lower chamber of the filter vessel. The rate of introduction of the resin slurry into the filter vessel was not controlled, and the use of chemicals in the precoat tank was necessary in order to control flocculation.

In accordance with this invention, a different group of elements is connected between flanged outlet 50 and flange 55 for metering ion exchange resin particles into the recirculating liquid at a controlled rate. These elements are illustrated inside rectangle 54.

As before, a pump 56 is provided, having its inlet connected through pipe 58 to flanged outlet 50, and having its outlet connected through pipe 60 to flange 55. Pump 56 is desirably a centrifugal pump. In addition there is provided a path leading from pipe 60 to pipe 58. This path includes pipe 62, a regulated valve 64, eductor 66, valve 68 and pipe 70.

A tank 72, having a motor-driven agitator 74, for temporarily storing a concentrated slurry of ion exchange resins, has its outlet connected to the suction opening of the eductor throat through valve 76. Valve 64 is regulated in accordance with the pressure of the fluid at its downstream side by controller 78 in such a way as to maintain this pressure constant. This pressure is sensed through a tube 80 leading from the downstream side of valve 64 to the controller. The assembly of valve 64, tube 80 and controller 78 constitutes a conventional adjustable pressure regulating valve. The effect of pressure regulation is to control the rate of flow of liquid through eductor 66, and thereby to control the amount of resin slurry drawn into the liquid stream through the eductor, and will consequently affect the rate at which the resin slurry is drawn into the eductor and delivered through pump 56 to the filter septum.

Figure 2:
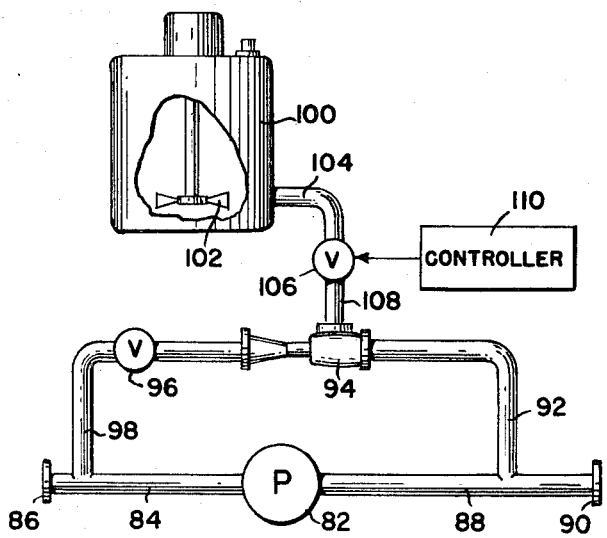
FIG. 2 is a schematic diagram showing an alternative apparatus for introducing a resin slurry into the liquid stream, which may be used in place of the apparatus within the rectangle in FIG. 1.

FIG. 2 shows an alternative assembly of elements which may be substituted for the elements enclosed in rectangle 54 in FIG. 1. Pump 82 has its inlet connected through pipe 84 to a flange 86 which may be connected to flanged outlet opening 50 of the precoat tank. The outlet of the pump is connected to pipe 88 to a flange 90 which may be connected to flange 55. A path leading from the outlet of the pump to its inlet is provided by pipe 92, eductor 94, valve 96 and pipe 98. A resin slurry tank 100, having a motor-driven agitator 102 has its outlet connected to the throat of the eductor through pipe 104, valve 106 and pipe 108. Valve 106 is associated with a controller 110 which effects intermittent opening of valve 106 with an adjustable duty cycle. The rate at which resin slurry is introduced into the recirculating liquid stream by this system is determined by the adjustment of controller 110.

Figure 3:
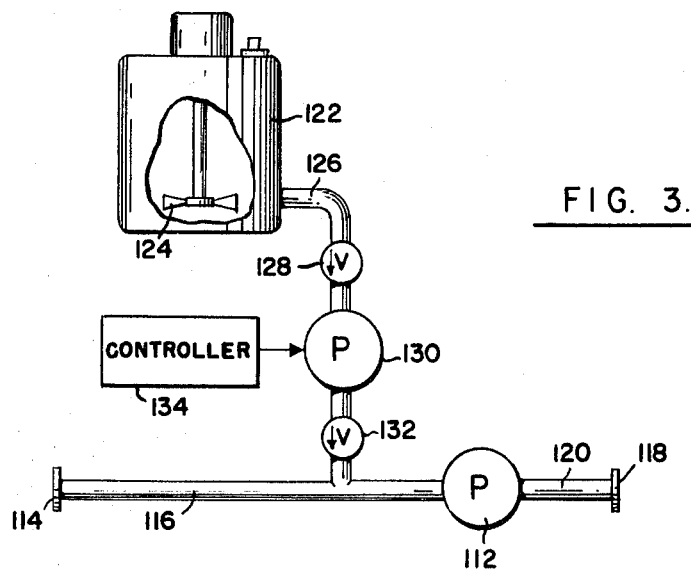
FIG. 3 shows another alternative apparatus for the introduction of a resin slurry into the liquid stream.

The assembly of elements shown in FIG. 3 can be substituted for the assembly within rectangle 54 in FIG. 1. The inlet of pump 112 is connected to flange 114 through pipe 116. Its outlet is connected to flange 118 through pipe 120. A resin slurry tank 122, having a motor-driven agitator 124 has its outlet 126 connected to pipe 116 through a variable displacement diaphragm pump comprising a check valve 128, pumping element 130 and a second check valve 132. A controller 134 controls the displacement of pumping element 130, and thereby controls the rate of introduction of the resin slurry into the recirculating liquid stream in pipe 116.

Figure 4:
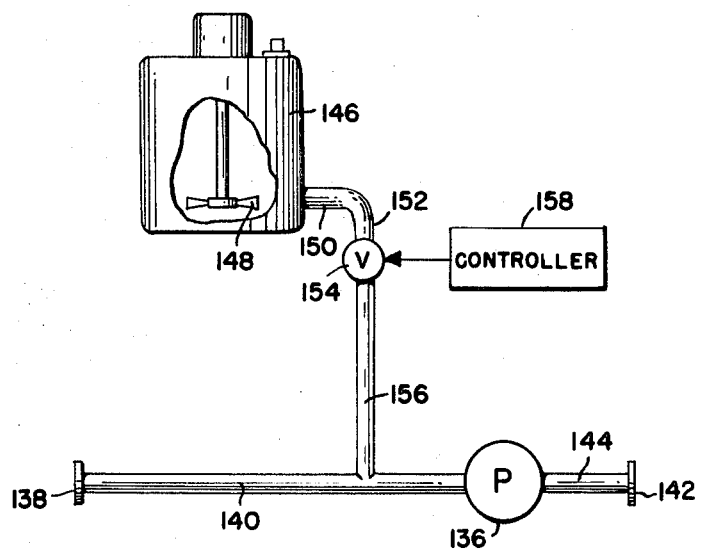
FIG. 4 shows still another alternative apparatus for introducing a resin slurry into the liquid stream.

The assembly in FIG. 4 may also be substituted for the assembly within rectangle 54 in FIG. 1. In FIG. 4, there is shown a pump 136, having its inlet connected to flange 138 through pipe 140; and having its outlet connected to flange 142 through pipe 144. An elevated resin slurry tank 146, having a motor-driven agitator 148, has its outlet 150 arranged above pipe 140 so that flow will take place by gravity from the outlet 150, through pipe 152, valve 154 and pipe 156 into the recirculating stream in pipe 140. The opening of the valve 154 is controlled by a controller 158, and the degree to which valve 154 is opened is determinative of the amount of resin slurry which is introduced into the recirculating liquid stream.

In operation of the embodiment of the invention illustrated in FIG. 1, a concentrated slurry of ion exchange resin particles is introduced into tank 72 or formed in tank 72 by mixing resin particles with a small amount of liquid, e.g., water. Agitator 74 should be maintained in operation at all times to maintain a uniform concentration of the slurry in tank 72. With valves 24 and 32 closed, and valves 48, 68, 76 and 53 open, and with controller 78 adjusted to the desired setting, pump 56 is started. The resin slurry is then drawn at a controlled rate through the eductor, and into the liquid stream approaching the filter vessel through pipe 20. The rate of introduction of the resin slurry into this stream is controlled by controller 78 so that it is as nearly as possible equal to the rate at which resin particles are deposited in the filter septum in vessel 2.

The modifications in FIGS. 2, 3 and 4 are operated similarly.

In each of the embodiments of the invention, the controller should be adjusted so that the rate at which the resin slurry is fed through inlet 20 to the lower chamber 4 of the filter vessel is equal to the rate at which it is deposited on the filter septa. This prevents any increase in concentration from occuring in the lower chamber 4 of the filter vessel, which would result in increased flocculation of the resin particles with the undesirable consequences mentioned previously. No undesirable flocculation occurs in the resin storage tank (72, 100, 122 or 146) because the high concentration of the resin slurry in the tank prevents an undesirable degree of flocculation from occuring. Elsewhere in the system, either the velocity is too high, or the concentration is too low for a heavy floc to form.

For the purpose of precoating, ion exchange resins may be introduced into the filter vessel either with or without filter aid, depending on whether or not tank 36 contains a filter aid slurry. Filter aid can be introduced into the filter vessel without resins by operating pump 56 with valve 68 closed off (FIG. 1); by operating pump 82 with valve 96 closed off (FIG. 2); by operating pump 112 with pumping element 130 not operating (FIG. 3); or by operating pump 136 with valve 154 closed (FIG. 4).

Ion exchange resins can be introduced as body feed or as part of the body feed along with filter aid, by operating the pump (56, 82, 112 or 136) with valves 53, 24, and 32 open and valve 48 closed.

The proper adjustment of the controllers, for various conditions of temperature, flow rate, etc. may be determined empirically by tests carried out with a particular system, or it may be determined by observing the changes in the flocculation in the filter vessel which take place when the settings of the controller are changed.

Ordinarily, the rate of flow in the recirculating path, the temperature of the liquid, and other factors affecting flocculation are sufficiently invariable that it is practical to set the rate of introduction of resin slurry at a constant. However, in systems where these factors vary, automatic control systems may be used. Automatic control of resin introduction, in response to conditions such as temperature and flow rate which affect flocculation, can be accomplished through well known analogue or digital techniques. Automatic control can also be accomplished by control systems which are directly responsive to flocculation conditions in the filter vessel. Such systems may utilize photoelectric detecting means or means for sensing changes in conductivity.

It will be apparent that each of the embodiments disclosed herein accomplishes effective control of flocculation without the necessity for the use of chemical additives. Various modifications can be made in the filter structure, the recirculation system and the system for controlling the introduction of resin slurry into the recirculating liquid.

We claim:

1. The method of precoating a filter septum within a filter tank with finely divided particles of a mixture of anion and cation ion exchange resins comprising the steps of:

pumping a liquid substantially free of polyelectrolyte resin through the filter septum in a recirculating stream, said stream having a sufficiently high velocity at least throughout a portion thereof immediately preceding the entrance of the filter tank to prevent the formation of a heavy floc, forming a highly concentrated slurry of said finely divided particles and storing said slurry in a vessel external to said recirculating stream, and introducing said slurry from said vessel into said portion of the liquid stream at a rate which is substantially constant over the period of introduction and substantially equal to the rate of deposition of said particles on the filter septum whereby an increase in the concentration of said particles within the filter tank is substantially prevented.

2. The method according to claim 1 in which said slurry is drawn into the liquid stream through the suction opening of an eductor.

3. The method according to claim 2 in which said rate of flow of liquid through the eductor is regulated by a control valve.

4. The method according to claim 2 in which the slurry is passed through a valve which is intermittently opened in a controlled duty cycle before being passed into the suction opening of the eductor.

5. The method according to claim 1 in which said slurry is pumped by a variable displacement pump into the liquid stream.

6. The method according to claim 1 in which said slurry is formed in an elevated storage tank and fed from said tank through a controllable throttling valve into said liquid stream.

* * * * *